United States Patent [19]

Thibodeaux

[11] 4,394,801
[45] Jul. 26, 1983

[54] MULTIFUNCTION, MULTIPURPOSE CONSTRUCTION TOOL

[76] Inventor: Francis Thibodeaux, Rte. 1, Box 125, Krotz Springs, La. 70750

[21] Appl. No.: 262,998

[22] Filed: May 12, 1981

[51] Int. Cl.³ .............................................. B43L 7/06
[52] U.S. Cl. ..................................... 33/496; 33/451; 33/471
[58] Field of Search ................ 33/451, 500, 423, 499, 33/495, 497, 471, 496, 498, 419

[56] References Cited

U.S. PATENT DOCUMENTS

| | | | |
|---|---|---|---|
| 404,451 | 6/1889 | Waggoner | 33/500 X |
| 524,417 | 8/1894 | Fahey | 33/499 |
| 658,262 | 9/1900 | Hester | 33/499 |
| 866,531 | 9/1907 | Sollers | 33/423 |
| 1,161,961 | 11/1915 | Pearl | 33/499 |
| 1,341,435 | 5/1920 | Olsen | 33/495 |
| 4,144,650 | 3/1979 | Rawlings et al. | 33/451 |

FOREIGN PATENT DOCUMENTS 274277  6/1951  Switzerland ........................ 33/451

Primary Examiner—William D. Martin, Jr.

[57] ABSTRACT

A multifunction, multipurpose construction tool comprised generally of two operating arms pivotally connected via their terminal ends, preferably their rounded terminal ends, one to the other, an angle indicator being provided at the pivotal connection, or hub, for reading the angle formed by the two arms. A pair of alternately disposed abutments are located at the extremities defining the rounded end of one of said arms as well as the beginning and end of the scale of angular component values of the scale. A stop located on the rounded terminal end of the other pivotally connected arm provides a means for indexing the scale of angular values between said alternately disposed abutments. In its preferred form, the operating arm carrying the indicia representative of the angular scale of values is constituted of a pair of alternately disposed generally similar spaced apart panels, the indicia marks are located on an outer surface of the rounded end of the pivotally connected terminal end of said member, and the opposite arm is constituted of a single panel which can be retracted within the spaced apart alternately disposed panels.

8 Claims, 7 Drawing Figures

MULTIFUNCTION, MULTIPURPOSE CONSTRUCTION TOOL

FIELD OF THE INVENTION

This invention relates to a combination tool, or multifunction, multipurpose tool for use by skilled construction craftsmen, e.g. mechanics, roofers, bricklayers, masons, pipefitters, carpenters and the like.

BACKGROUND OF THE INVENTION

Combination tools, or multipurpose tools which combine in a single unit such functions as a level, square and protractor are known. Reference is made, e.g., to U.S. Pat. Nos. 1,014,402; 1,086,545; 2,247,327 and 4,144,650. In general, these tools are constituted of two arms pivotally connected one to another via their terminal ends, and scalar means for reading the relative angles formed between the two arms in taking measurements. Means, e.g. bubble vials, are usually mounted on one of the arms so that the device can be used to measure levels.

In particular, it is an object of this invention to provide a combination tool, or multipurpose/multifunction tool, for use by construction craftsmen in measuring angles, for radius marking, for determining roof pitch, for rafter cuts, for squaring, for plumbing or levelling, and for general layout work. For example, a plumber can use the tool for determining the angles of pipes, levelling and plumbing pipes and general piping layout work.

A more particular object is to provide a novel tool of simple structure, particularly one which can be easily manufactured, and used with relative ease, and speed.

These objects and others are achieved in accordance with the present invention which embodies a multifunction/multipurpose tool comprising in combination two operating arms pivotally connected one to the other via a terminal end, an angle indicator being provided at the pivotal connection, or hub, for reading the angular relationship between the two pivotally connected arms. The angle indicator and manner in which the arms are formed and affixed one to the other, constitutes a key and novel feature of the tool, the angle indicator in particular being of relatively simple construction, this permitting ease of manufacture and use.

The operating arms of the tool are constituted of rounded pivotally connected ends. An angular scale with indicia marks is located on the rounded end of one of the arms, and it contains a pair of alternately disposed abuttments located at the extremities defining the rounded end of one of said arms as well as the beginning and end of the scale of angular component values of the scale. A stop located on the rounded terminal end of the other pivotally connected arm provides a means for indexing the scale of angular values between said alternately disposed abuttments.

In its preferred form, the operating arm carrying the indicia representative of the scale of values is constituted of a pair of alternately disposed generally similar spaced apart panels, the indicia marks are located on an outer surface of the rounded end of the pivotally connected terminal end of said member, and the opposite arm is constituted of a single panel which can be retracted within the spaced apart alternately disposed panels constituting said opposite arm.

This invention, and its principle of operations, will be better understood by reference to the following detailed description of a specific, and preferred embodiment, and to the attached drawing to which reference is made in the description. In the figures, similar numbers are used to represent similar parts or components. Subscripts are used with numbers to represent sub-components, or sub-features of a larger component.

In the drawing:

FIGS. 1 and 1A depict a plan view illustrating the multifunction, multipurpose tool of this invention.

Figure 1:
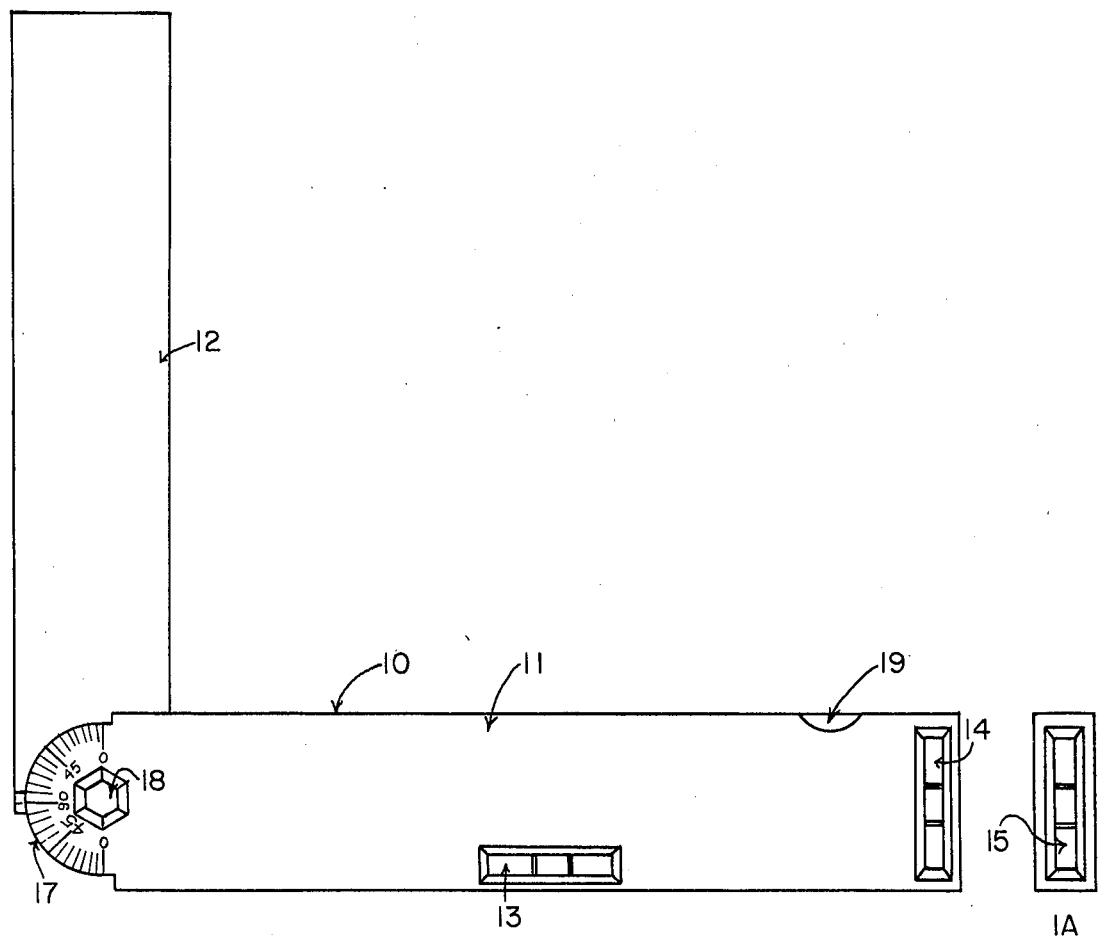
Figure 2:
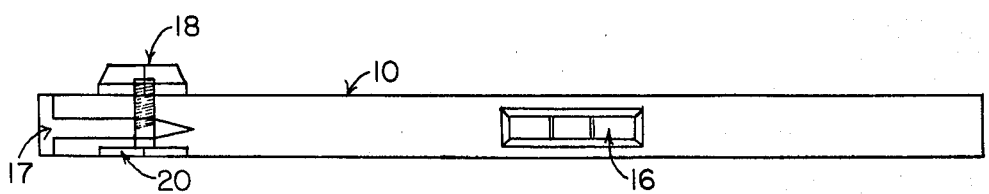
FIG. 2 depicts a side elevation view of the multifunction, multipurpose tool of this invention.
Figure 3:
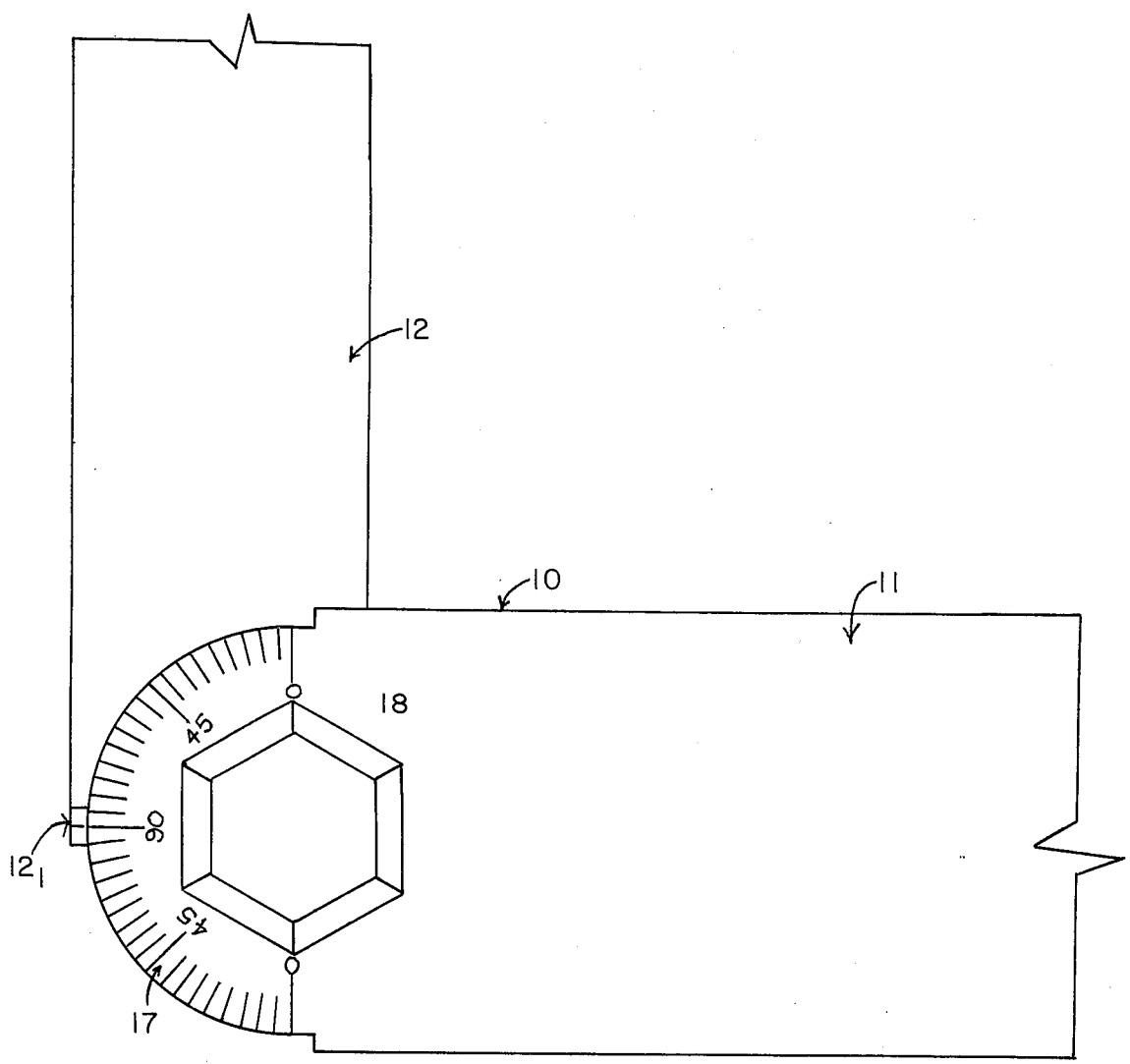
FIG. 3 is a fragmentary, enlarged view of the multifunction, multipurpose tool showing in particular the section wherein the pivotally connected arms are adjoined one to the other.
Figure 4:
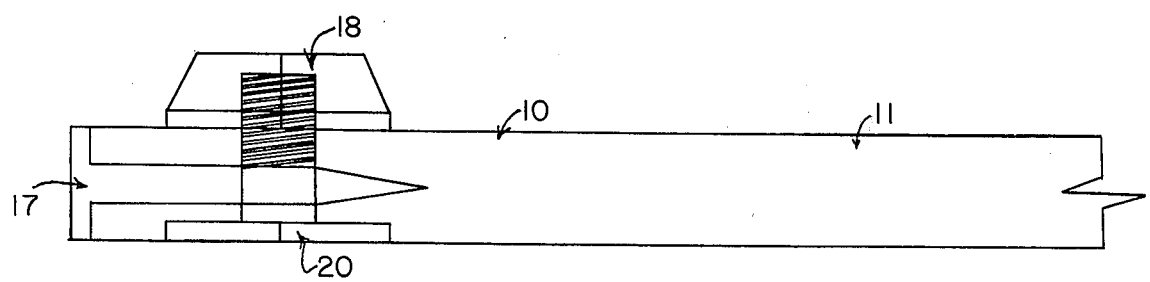
FIG. 4 is a fragmentary, enlarged side elevation view of that section of the device illustrated by reference to FIG. 3.

Referring to the figures, more specifically to FIGS. 1 through 4, there is depicted a multifunction, multipurpose tool 10 which includes generally a pair of pivotally connected operating arms 11, 12. The arm 11 is provided with level indicating means comprised of bubble vials 13, 14, 15, 16; the bubble vial 13 being located on the upper surface and coaxially aligned with the major axis of arm 11, the bubble vial 14 being located on the upper surface and perpendicularly aligned with the major axis of arm 11, bubble vial 15 being located on the connected end of arm 11 and aligned with the major axis of arm 11 (as depicted by reference to FIG. 1A), and bubble vial 16, like bubble vial 13, is aligned perpendicular with the major axis of arm 11 but located on the outside edge of arm 11. The pivotal end of arm 11 is provided with an angle indicator 17, or scale of angular values which, in registry with indicia mark $12_1$ located on arm 12, is used to read angles ranging between 0° and 180°. The arms 12, 13 are pivotally joined together at the angle indicator 17 via means of the bolt 20. The threaded end of the bolt 20 is extended through openings within the terminal ends of each of said arms, and it is threadably engaged and affixed via the nut 18 located on the upper surface of the adjoined arms. The enlarged flat head of the bolt 20, as will be observed, is fitted inside a recess within the underside of arm 11; its outer surface being flush with the outer, lower surface of arm 11.

Figure 5:
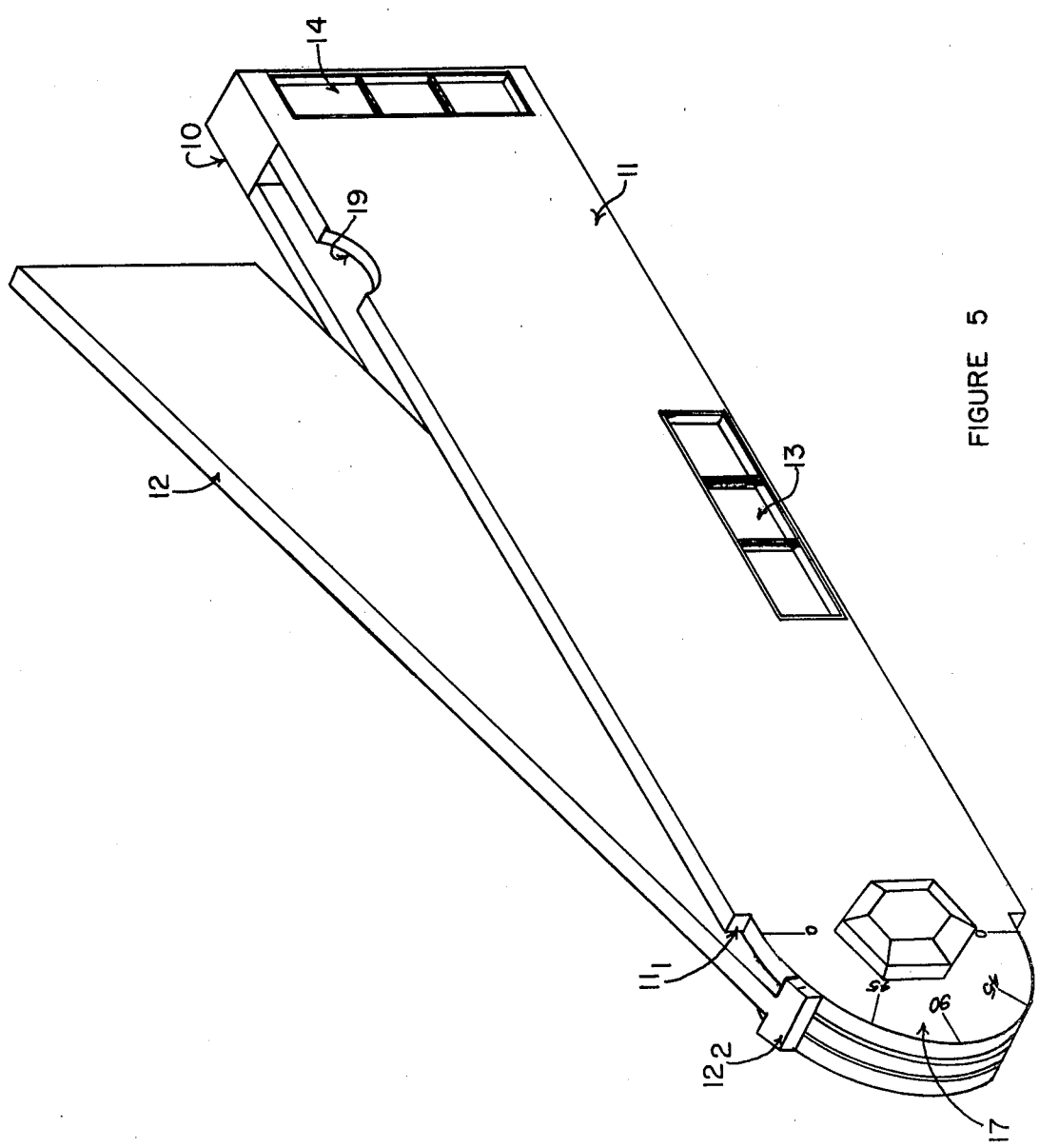
FIG. 5 is a perspective view of the multifunction, multipurpose tool taken along the same side of the device as displayed in FIG. 1.
Figure 6:
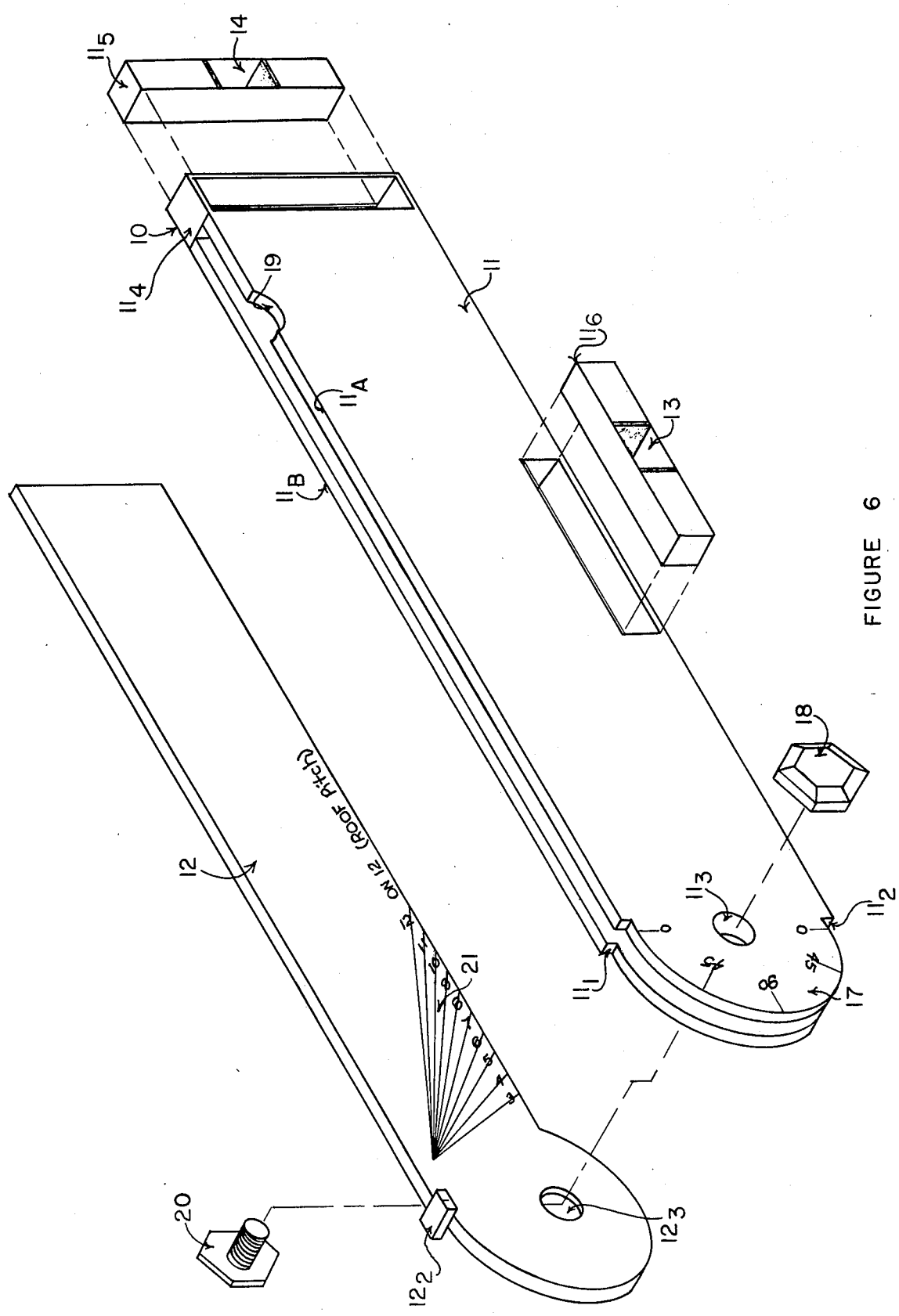
FIG. 6 is an exploded view, in perspective, of the basic components of the multifunction, multipurpose tool of this invention.

These and other details of the multifunction, multipurpose tool 10 are best shown by reference to FIGS. 5 and 6. Referring to these figures, it will be observed that the arm 11 is constituted of a pair of spaced apart parallelly aligned planar members $11_A$, $11_B$ joined together at the rearward end by the hollowed out end piece $11_4$, this member containing a block $11_5$ which contains bubble vials 14, 15. Bubble vial 13 is likewise contained within a block $11_6$ located in the lower side of arm 11. The forward ends of planar members $11_A$, $11_B$ are provided with openings, or aperatures $11_3$ within which is fitted the rounded forward end of arm 12, this arm also containing an opening, or aperature $12_3$ through which bolt 20 is projected and retained via nut 18 to pivotally attach the arm 12 within the forward end of arm 13. In place, the arm 12 is rotatable from 0° through 180°. At 0° the stop $12_2$ on arm 12 impinges upon the abuttment, or notch $11_1$ at the forward, upper end of arm 11, and at such angle the arm 12 is essentially contained inside the space between planar member $11_A$, $11_B$. At 180° the stop $12_2$ of arm 12 impinges upon the abuttment, or notch $11_2$ located at the forward, lower end of arm 11. The arm 12 is thus readily movable between these limits to measure angles ranging from above 0° to 180°. The arm 12 is readily moved from the 0° position to measure an angle by pulling said arm from between planar members $11_A$, $11_B$ with the fingers, the grasp being facilitated by use of finger notch 19 located toward the rearward end of arm 11.

The angle indicator 17, and the manner in which it is formed and integrated within the forward ends of arm 11, 12 constitutes a key and novel feature of the multifunction, multipurpose tool 10. The angle indicator is visible at a glance in reading angles greater than 0°, up to 180°, the scale located on the rounded end of the arm being unconcealed by functional apparatus parts. The angle indicator 17 is readily set at 90° for measurement of perpendicular layouts, especially the measurement of inside obtuse angles. Roof pitch marks 21 can be scribed on the underside of arm 12, indicia being particularly useful for laying out roofing angles. This option saves time and obviates the need for use of a framing square for setting angles, as now commonly used by roofers and carpenters. The multifunction, multipurpose tool 10 is useful in drawing semi-circles or arcs, and its smooth, non-rigid thin profile design, unlike many prior art tools, permits it to be laid flat for basic layout work; and it is a comfortable pocket tool. The tool can also be employed to measure surface levels.

It is apparent that various modifications and changes can be made without departing the spirit and scope of the present invention. For example, it is apparent that the purpose of arm 12 is to define an edge, line or parimeter, relative to another formed with arm 11 for a measurement. The angle of arm 12 from its base position at 0°, at any angle up to 180° is readily read from the angle indicator 17. Various indicia marks, in virtually any system metric, English or the like, on the other hand, can be scribed on the blade 12 for various measurements, then indicating the relative positioning between arms 11, 12.

The tool can be constructed of virtually any material, wood, metal, rigid plastic or the like. The arms can be of solid or laminated construction, and are preferably formed of wood or rigid plastic. Changes in size, shape, or in the absolute or relative dimensions of the parts, materials and the like will thus be apparent to those skilled in the art.

Having described the invention, what is claimed is:

1. In apparatus characterized as a multifunction, multipurpose tool for use in the construction trades, which includes in combination a pair of operating arms having rounded terminal ends, the arms being pivotally connected via an axis through said rounded terminal ends one to the other, an angle indicator provided at the pivotal connection for reading the angular relationship between said pair of arms, the improvement comprising, on a first arm an angular scale of indicia marks located on the outer surface of the outermost rounded end of said arm outboard of the pivotal axis through which said pair of arms are adjoined, a pair of alternately disposed abuttments located at the extremities defining the rounded end of said arm, the abuttments further defining the beginning and end of said scale of angular component values, and on the second arm a stop located on an outer edge of the rounded terminal end of said arm movable in unison therewith for indexing the scale of angular values between the alternately disposed abuttments.

2. The apparatus of claim 1 wherein the first operating arm carrying the indicia representative of the scale of values is constituted of a pair of alternately disposed generally similar spaced apart panels, and the opposite arm is constituted of a single panel which can be retracted within the spaced apart alternately disposed panels constituting said arm.

3. The Apparatus of claim 2 wherein the pivotally connected terminal ends of the two arms contain openings, the two arms are joined together via a bolt, and the upper surface constituting the head of the bolt is flush with the outside surface of said arm within which the head of the bolt is outwardly faced.

4. The Apparatus of claim 2 wherein a surface of the operating arm constituted of a single panel member is scribed with indicia representative of roof pitch, by virtue of which the pitch of a roof can be easily and rapidly measured.

5. The Apparatus of claim 2 wherein an outer surfaces of the operating arm constituted of a pair of alternately disposed generally similar spaced apart panels is provided with bubble vials in sufficient number and orientation for measuring levels.

6. The Apparatus of claim 2 wherein the upper surface of one of the outer surfaces of the operating arm constituted of a pair of alternately disposed generally similar spaced apart panels is notched to facilitate withdrawal of the opposite arm when retracted.

7. The Apparatus of claim 2 wherein the scale defining the beginning and end of the scale of angular component values ranges from 0° to 180°.

8. The Apparatus of claim 7 wherein the scale at mid point reads 90°, the two extremities reads 0°, and the total angular value for angles greater than 90° is obtained by adding the values actually read.

* * * * *